US012394826B2

(12) United States Patent
Wang et al.

(10) Patent No.: US 12,394,826 B2
(45) Date of Patent: Aug. 19, 2025

(54) ELECTRODE ASSEMBLY AND BATTERY

(71) Applicant: Ningde Amperex Technology Limited, Ningde (CN)

(72) Inventors: Pan Wang, Ningde (CN); Xiao Chen, Ningde (CN); Huijun Liu, Ningde (CN); Changchuan Shi, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 840 days.

(21) Appl. No.: 17/281,360

(22) PCT Filed: May 20, 2020

(86) PCT No.: PCT/CN2020/091385
§ 371 (c)(1),
(2) Date: Mar. 30, 2021

(87) PCT Pub. No.: WO2021/232313
PCT Pub. Date: Nov. 25, 2021

(65) Prior Publication Data
US 2022/0115712 A1    Apr. 14, 2022

(51) Int. Cl.
*H01M 10/0587*    (2010.01)
*H01M 50/531*    (2021.01)

(52) U.S. Cl.
CPC ..... *H01M 10/0587* (2013.01); *H01M 50/531* (2021.01)

(58) Field of Classification Search
CPC ................. H01M 10/0587; H01M 50/531
(Continued)

(56) References Cited

U.S. PATENT DOCUMENTS 8,597,829 B2    12/2013    Kaiduka et al.
2010/0233525 A1*    9/2010    Kaiduka .............. H01M 50/46
429/164

(Continued)

FOREIGN PATENT DOCUMENTS

CN    202205852 U    4/2012
CN    206697567 U    12/2017
(Continued)

OTHER PUBLICATIONS

International Search Report issued on Jan. 27, 2021 in corresponding International application No. PCT/CN2020/091385; 9 pages.
(Continued)

*Primary Examiner* — Niki Bakhtiari
*Assistant Examiner* — Omar M Kekia
(74) *Attorney, Agent, or Firm* — Maier & Maier, PLLC (57) ABSTRACT

An electrode assembly formed by winding a first electrode plate, a separator and a second electrode plate. The first electrode plate comprises a first current collector and a first active material layer arranged on a surface of the first current collector. A winding terminating end of the first electrode plate is positioned on an outer side of a winding terminating end of the second electrode plate facing away from a winding core. The first active material layer on the winding terminating end of the first electrode plate covers one surface of the first current collector facing toward the second electrode plate, The electrode assembly further comprises a first adhesive member arranged on an outer surface of the electrode assembly. The electrode assembly takes the winding terminating end of the first electrode plate as the tail end. The application further provides a battery having the same.

19 Claims, 6 Drawing Sheets

(58) Field of Classification Search
USPC .......................................................... 429/211
See application file for complete search history.

(56) References Cited

U.S. PATENT DOCUMENTS

| | | | | |
|---|---|---|---|---|
| 2010/0310912 | A1* | 12/2010 | Kim | H01M 10/0587 |
| | | | | 429/94 |
| 2015/0171383 | A1* | 6/2015 | Ahn | H01M 50/434 |
| | | | | 428/354 |
| 2017/0244129 | A1* | 8/2017 | Seong | H01M 50/124 |
| 2018/0083311 | A1 | 3/2018 | Kim et al. | |
| 2018/0083319 | A1* | 3/2018 | Xiao | H01M 10/0459 |
| 2019/0229361 | A1 | 7/2019 | Kim et al. | |
| 2020/0044225 | A1* | 2/2020 | Eo | H01M 10/04 |
| 2020/0044274 | A1 | 2/2020 | He et al. | |

FOREIGN PATENT DOCUMENTS

| | | | |
|---|---|---|---|
| CN | 107863550 | A | 3/2018 |
| CN | 109461879 | A | 3/2019 |
| CN | 109755461 | A | 5/2019 |
| CN | 110034323 | A | 7/2019 |
| JP | 2010212086 | A | 9/2010 |
| JP | 2018170162 | A | 11/2018 |
| KR | 1020100102059 | A | 9/2010 |
| KR | 1020100131166 | A | 12/2010 |
| KR | 1020180032019 | A | 3/2018 |
| KR | 1020180046145 | A | 5/2018 |

OTHER PUBLICATIONS

Notice of Grant of Invention Patent Right issued on Aug. 10, 2022, in corresponding Chinese Application No. 202080004985.9, 8 pages.
Review Decision Letter issued on Jul. 26, 2022, in corresponding Chinese Application No. 202080004985.9, 2 pages.
Office Action issued on Apr. 12, 2022, in corresponding Chinese Application No. 202080004985.9, 8 pages.
Office Action issued on Sep. 8, 2021, in corresponding Chinese Application No. 202080004985.9, 12 pages.
Office Action issued on Jan. 11, 2022, in corresponding Chinese Application No. 202080004985.9, 10 pages.
Examination Report issued on Dec. 29, 2022, in corresponding Indian Application No. 202117015259, 7 pages.
Office Action issued on Sep. 27, 2022, in corresponding Japanese Application No. 2021-517412, 10 pages.
Office Action issued on Apr. 11, 2023, in corresponding Japanese Application No. 2021-517412, 10 pages.
Office Action issued on Sep. 26, 2023, in corresponding Japanese Application No. 2021-517412, 6 pages.
Office Action issued on Mar. 28, 2023, in corresponding Korean Application No. 10-2021-7014216, 14 pages.
Extended European Search Report issued on Oct. 26, 2021, in corresponding European Application No. 20866924.2, 7 pages.
Written Decision on Registration issued on Jan. 8, 2024, in corresponding Korean Application No. 10-2021-7014216, 6 pages.

* cited by examiner

FIG. 9

ELECTRODE ASSEMBLY AND BATTERY

CROSS REFERENCE TO RELATED APPLICATION

This application is a National Stage of the PCT international application Serial No. PCT/CN2020/091385, filed on May 20, 2020, and the entire content of which is incorporated herein by reference.

TECHNICAL FIELD

The application relates to the field of batteries, in particular to an electrode assembly and a battery having the same.

BACKGROUND

Generally, when wound batteries come to the end of manufacturing, the tail of an outer electrode plate of a battery core comprises part of plain aluminum foil (without an active material coating on both sides). The battery core is usually packaged in a sealing way using an aluminum-plastic film, and a clearance exists between the battery core and a housing which packages the battery core in a sealing way. When such battery core suffers from an impact from an heavy object, the housing made of the aluminum-plastic film usually does not break or breaks incompletely due to its relatively high ductility, but the battery core itself breaks, and broken chips, in particular those generated by the plain aluminum foil in the outer ring, packaged and bound by the housing, contact the broken electrode plate of the battery core to cause a short-circuit heating and even fire explosion.

SUMMARY

In view of the foregoing situation, it is necessary to provide an electrode assembly without an outer plain aluminum foil and with high safety and a battery having the same.

An embodiment of the application provides an electrode assembly, which comprises a first electrode plate, a second electrode plate and n separator, the first electrode plate and the second electrode plate are opposite in polarity, the separator is arranged between the first electrode plate and the second electrode plate, and the electrode assembly is formed by winding the first electrode plate, the separator and the second electrode plate. The first electrode plate comprises a first current collector and a first active material layer; the first active material layer is arranged on a surface of the first current collector; a winding terminating end of the first electrode plate is positioned on the outer side of a winding terminating end of the second electrode plate facing away from a wound core; the first active material layer on the winding terminating end of the first electrode plate covers one surface of the first current collector facing toward the second electrode plate, and the other surface of the first current collector on the winding terminating end of the first electrode plate facing away from the second electrode plate is not coated with the first active material layer. The electrode assembly further comprises a first adhesive member, and the first adhesive member is arranged on an outer surface of the electrode assembly.

In an optional embodiment, the first adhesive member is a semi-liquid viscous material, arranged on the outer surface of the electrode assembly by means of spot coating or coating.

In an optional embodiment, the first adhesive member has a thickness of smaller or equal to 20 μm.

In an optional embodiment, the electrode assembly further comprises a second adhesive member; the first adhesive member is connected to the second adhesive member; and the second adhesive member is connected to the winding terminating end of the first electrode plate and covers part of the outer surface of the electrode assembly.

Further, the second adhesive member has a thickness of 15 μm-25 μm.

In an optional embodiment, the winding terminating end of the second electrode plate extends out of the winding terminating end of the first electrode plate along a winding direction.

Further, the winding terminating end of the separator extends out of the winding terminating end of the second electrode plate along the winding direction.

In an optional embodiment, the electrode assembly further comprises a first tab and a second tab, wherein the first tab is connected to the first electrode plate, the second tab is connected to the second electrode plate, and along the thickness direction of the electrode assembly, the projections of the first tab and the second tab are not overlapped.

Further, a winding starting end of the first electrode plate is provided with a first plain foil area; a winding starting end of the second electrode plate is provided with a second plain foil area; the first tab is arranged in the first plain foil area; and the second tab is arranged in the second plain foil area.

Further, the electrode assembly further comprises a first insulating member, and the first insulating member is arranged in the first plain foil area and covers the first tab.

In an optional embodiment, the first adhesive member has a bonding force of 100-1000 N/m, and a tensile breaking stress of smaller than or equal to 4000 N/m.

An embodiment of the application further provides a battery, which comprises an electrode assembly and a package, wherein the electrode assembly is any one of the foregoing electrode assemblies, the electrode assembly is accommodated in the package, and the tabs of the electrode assembly extend out of the package.

The electrode assembly takes a first cutout portion as the tail end, such that the electrode plate at the outermost ring of an battery core assembly is of a design without the plain aluminum foil, which saves aluminum foil consumables of a single battery core and greatly lowers the possibility of generating aluminum chips, thereby greatly eliminating the risk of short circuits caused by chips, avoiding the risk of fire explosion of the battery core, and enhancing the safety of the battery core used in extreme conditions. A first adhesive member is further provided on a surface of the electrode assembly, and when the electrode assembly is accommodated in the package, the first adhesive member can bond the outer surface of the electrode assembly and the package together. When suffering from external impacts because of drop, collision, etc., the electrode assembly and the outside package can be tightly connected together and do not generate relative displacement, thereby reducing shear damage.

REFERENCE NUMERALS OF MAIN ELEMENTS

| Electrode assembly | 100 |
|---|---|
| First plane | 101 |
| Second plane | 102 |
| First arc surface | 103 |
| Second arc surface | 104 |
| Plain aluminum foil | 105 |
| Insulating tape | 106 |
| First electrode plate | 10 |
| First current collector | 11 |
| First active material layer | 12 |
| Winding terminating end | 13 |
| First plain foil area | 14 |
| Second electrode plate | 20 |
| Second current collector | 21 |
| Second active material layer | 22 |
| Second plain foil area | 23 |
| Separator | 30 |
| Winding terminating end | 31 |
| First adhesive member | 41 |
| Second adhesive member | 42 |
| First tab | 50 |
| Second tab | 60 |
| First insulating member | 70 |
| Second insulating member | 80 |
| Battery | 200 |
| Package | 201 |

DETAILED DESCRIPTION OF EMBODIMENTS

The following clearly and fully describes the technical solutions in the embodiments of the application by reference to the accompanying drawings in the embodiments of the application. Apparently, the described embodiments are merely a part of but not all of the embodiments of the application. Based on the embodiments in the application, all other embodiments made by an ordinarily skilled in the art without creative labor fall within the protective scope of the application.

It needs to be noted that when an element is described to be "fixed to" another element, it can be directly on another element or an intermediate element may exist. When an element is deemed to be "connected to" another element, it can be directly connected to another element or it is possible that an intermediate element exists at the same time. When an element is deemed to be "arranged on" another element, it can be directly arranged on another element or it is possible that an intermediate element exists at the same time. Terms, "perpendicular", "horizontal", "left", "right" and similar expressions, used herein are for the purpose of illustration only.

Unless otherwise defined, all technical and scientific terms used herein have the same meanings as usually understood by a person skilled in the technical field of this application. The terms used in the description of the application herein are merely intended for describing specific embodiments but are not intended to limit this application. The term "or/and" used herein comprises one or any one of and all of combinations of a plurality of relevant listed items.

An embodiment of the application provides an electrode assembly, which comprises a first electrode plate, a second electrode plate and a separator, wherein the first electrode plate and the second electrode plate are opposite in polarity, the separator is arranged between the first electrode plate and the second electrode plate, and the electrode assembly is formed by winding the first electrode plate, the separator and the second electrode plate. The first electrode plate comprises a first current collector and a first active material layer; the first active material layer is arranged on the surface of the first current collector; a winding terminating end of the first electrode plate is positioned on an outer side of a winding terminating end of the second facing away from a winding core electrode plate, the first active material layer on the winding terminating end of the first electrode plate covers one surface of the first current collector facing toward the second electrode plate, and the other surface of the first current collector on the winding terminating end of the first electrode plate facing away from the second electrode plate is not coated with the first active material layer. The electrode assembly further comprises a first adhesive member, and the first adhesive member is arranged on an outer surface of the electrode assembly.

The electrode assembly takes the winding terminating end of the first electrode plate as the tail end, such that the electrode plate at the outermost ring of an battery core assembly is of a design without the plain aluminum foil, which saves aluminum foil consumables of a single battery core and greatly lowers the possibility of generating aluminum chips, thereby greatly eliminating the risk of short circuits caused by chips, greatly eliminating the risk of fire explosion of the battery core, and enhancing the safety of the battery core used in extreme conditions. A first adhesive member is further provided on the surface of the electrode assembly, and when the electrode assembly is accommodated in the package, the first adhesive member can bond the outer surface of the electrode assembly and the package together. When suffering from external impacts because of drop, collision, etc., the electrode assembly and the outside package can be tightly connected together and do not generate relative displacement, thereby reducing shear damage.

The following describes some embodiments of the application in detail. To the extent that no conflict occurs, the following embodiments/implementations and the features in the embodiments/implementations may be combined with each other.

Figure 1:
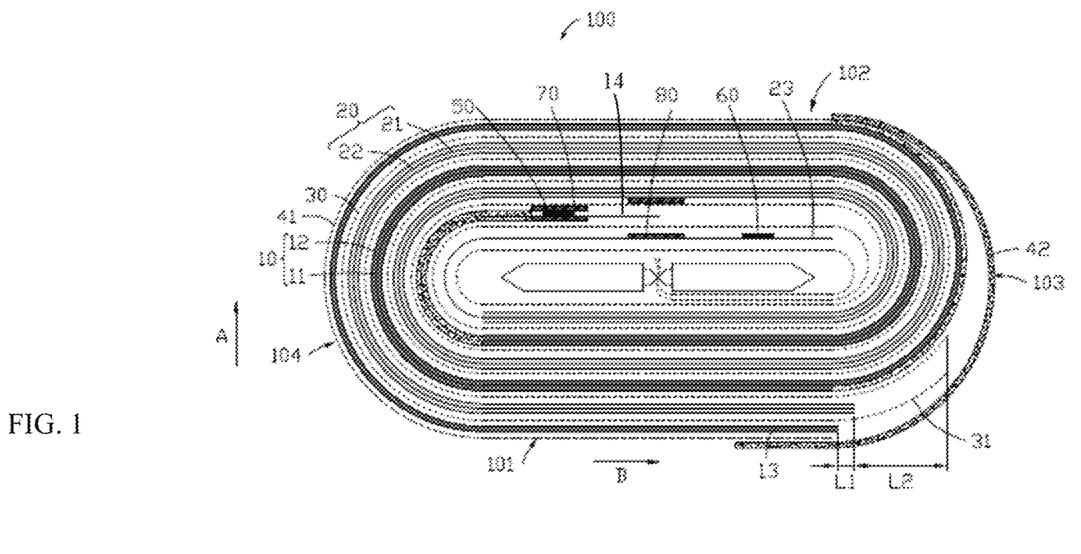
FIG. 1 is a winding structural diagram of an electrode assembly in an embodiment.

Referring to FIG. 1, in an embodiment of the application, an electrode assembly 100 comprises a first electrode plate 10, a second electrode plate 20 and a separator 30. The first electrode plate 10 and the second electrode plate 20 are opposite in polarity. The separator 30 is arranged between the first electrode plate 10 and the second electrode plate 20. The electrode assembly 100 is formed by winding the first electrode plate 10, the separator 30 and the second electrode plate 20 around a winding needle, and after the winding process is finished, the winding needle is taken out of the electrode assembly 100. The first electrode plate 10 comprises a first current collector 11 and a first active material layer 12. The first active material layer 12 is arranged on a surface of the first current collector 11. A winding terminating end of the first electrode plate 10 is positioned on an outer side of a winding terminating end of the second electrode plate 20 facing away from a winding core.

In an embodiment of the application, the first electrode plate 10 is a cathode electrode plate; the first current collector 11 may be an aluminum foil layer; and the first active material layer 12 is a cathode active material layer, which may be selected from electrochemical active materials that enable reversible intercalation and deintercalation of lithium ions such as $LiCoO_2$ and $LiFePO_4$. The second electrode plate 20 is an anode electrode plate, which comprises a second current collector 21 and a second active material layer 22, wherein the second current collector may be a copper foil layer, and the second active material layer 22 may be selected from electrochemical active materials that enable intercalation of lithium ions such as graphite, soft carbon, hard carbon and $Li_4Ti_5O_{12}$.

The winding terminating end 13 of the first electrode plate 10 is a structure of the outermost electrode plate of the electrode assembly 100. The first active material layer 12 on the winding terminating end 13 of the first electrode plate 10 covers one surface of the first current collector 11 facing toward the second electrode plate 20. The other surface of the first current collector 11 on the winding terminating end 13 of the first electrode plate 10 facing away from the second electrode plate 20 is not coated with the first active material layer 12.

The electrode assembly 100 further comprises a first adhesive member 41 and a second adhesive member 42, wherein the first adhesive member 41 is arranged on the outer surface of the electrode assembly 100 to bond the electrode assembly 100 and a package so as to narrow or eliminate the fitting clearance between them, and the second adhesive member 42 is connected to the winding terminating end of the first electrode plate 10 and covers part of the outer surface of the electrode assembly 100.

In an embodiment of the application, the first adhesive member 41 is a semi-liquid viscous material, arranged on the outer surface of the electrode assembly 100 by means of spot coating and coating. When a battery suffers from impacts because of drop, collision, etc., the electrode assembly 100 and the outside package can be tightly connected together and do not generate relative displacement, thereby reducing shear damage. The first adhesive member 41 may be a hot melt layer, and the material of the first adhesive member may be a rubber binder, an acrylic binder, etc., which can become viscous under certain pressure (3 MPa) and temperature (≤120° C.) conditions so as to firmly bond the outer surface of the electrode assembly 100 and the package together. The first adhesive member 41 has a thickness of less than or equal to 20 μm, a bonding force of 100-1000 N/m, and a tensile breaking stress of smaller than or equal to 4000 N/m.

In an optional embodiment, the second adhesive member 42 is hot melt adhesive or insulating adhesive, optionally super-thin hot melt adhesive with a thickness of 15 μm-25 μm, and the material of the second adhesive member 42 may be a rubber binder, used in combination with PET. Under certain pressure (≤3 MPa) and temperature (≤120° C.) conditions, the second adhesive member 42 can become viscous. In another word, the hot melting temperature of the second adhesive member 42 is smaller than or equal to 120° C., and the hot melting pressure is smaller than or equal to 3 MPa.

Referring to FIG. 1 again, the outer surface of the electrode assembly 100 includes a first plane 101, a second plane 102, a first arc surface 103 and a second arc surface 104. Along the thickness direction (a direction pointed at by arrow A in FIG. 1) of the electrode assembly 100, the first plane 101 and the second plane 102 are arranged opposite to each other. Along the width direction (a direction pointed at by arrow B in FIG. 1) of the electrode assembly 100, the first arc surface 103 and the second arc surface 104 are arranged opposite to each other, and the first arc surface 103 and the second arc surface 104 are connected between the first plane 101 and the second plane 102, respectively.

The winding terminating end of the first electrode plate 10 is approximately positioned at the boundary between the first plane 101 and the first arc surface 103. The second adhesive member 42 is connected to the winding terminating end of the first electrode plate 10 and attached to the first arc surface 103, preventing the second adhesive member 42 from increasing the thickness of the electrode assembly 100. The first adhesive member 41 is connected to the second adhesive member 42 and covers the first plane 101, the second plane 102 and the second arc surface 104. In another word, the area on the outer surface of the electrode assembly 100 is covered by the first adhesive member 41, wherein the area is not attached with the second adhesive member 42. In other embodiments, the winding terminating end of the first electrode plate can further be positioned in the first plane 101 or the second plane 102, and correspondingly, the second adhesive member 42 can further be attached to the first plane 101 or the second plane 102.

Further, to prevent burrs generated by lithium separation at an end portion of the second electrode plate 20 from resulting in short circuits when the burrs penetrate through the separator 30 and connect the first electrode plate 10, the winding terminating end of the second electrode plate 20 extends out of the winding terminating end 13 of the first electrode plate 10 along a winding direction of the electrode plate. The extension length L1 is greater than or equal to 2 mm. The winding terminating end 31 of the separator 30 extends out of the winding terminating end of the second electrode plate 20 along the winding direction and is attached to the inner surface of the second adhesive member 42. The length L2 of the winding terminating end 31 of the separator 30 is greater than or equal to 4 mm. The winding terminating end of the second electrode plate 20 is covered by the winding terminating end 31 of the separator 30 so as to protect and insulate the winding terminating end of the second electrode plate 20.

Figure 3:
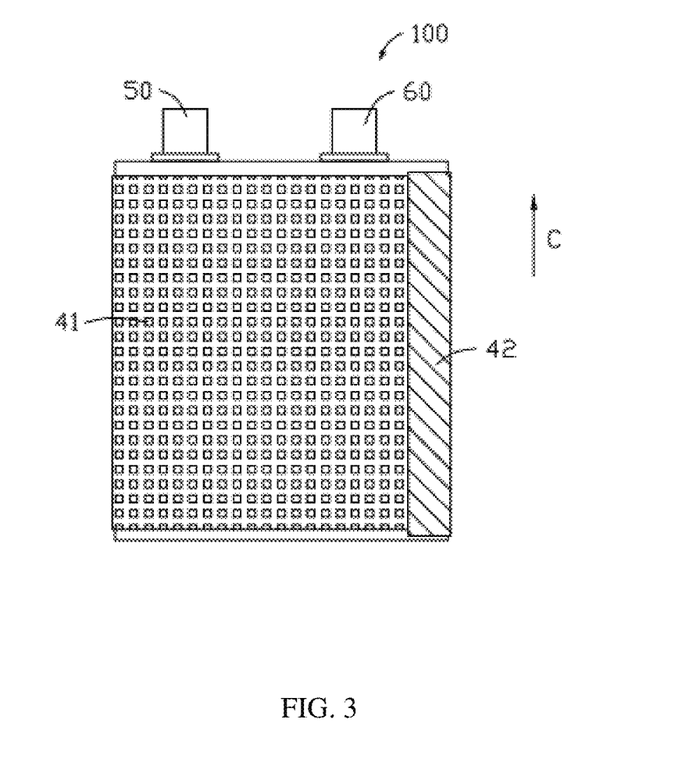
FIG. 3 is a structural diagram of an electrode assembly in an embodiment.

Referring to FIG. 1 and FIG. 3, the electrode assembly 100 further comprises a first tab 50 and a second tab 60, wherein the first tab 50 is connected to the first electrode plate 10, and the second tab 60 is connected to the second electrode plate 20. Along the thickness direction of the electrode assembly 100, the projections of the first tab 50 and the second tab 60 are not overlapped. Along the length direction (a direction pointed at by arrow C in FIG. 3) of the electrode assembly 100, the first tab 50 and the second tab 60 extend out of the same end of the electrode assembly 100. In other embodiments, the first tab 50 and the second tab 60 can extend out of different ends of the electrode assembly 100. The application is not limited to such way.

Further, a winding starting end of the first electrode plate 10 is provided with a first plain foil area 14; a winding starting end of the second electrode plate 20 is provided with a second plain foil area 23; the first tab 50 is arranged in the first plain foil area 14; and the second tab 60 is arranged in the second plain foil area 23. The electrode assembly 100 comprises a first insulating member 70. The first insulating member 70 is arranged in the first plain foil area 14 and covers the first tab 50, preventing the burrs on the first tab 50 from resulting in short circuits when the burrs penetrate through the separator 30 and contact the second electrode plate 20. In an alternative embodiment, the first insulating member 70 can be an insulating tape, which extends from the first tab 50 to a starting end of the first active material layer 12 and almost covers the entire first plain foil area 14, or another insulating member 70 is arranged between the first tab 50 and the starting end of the first active material layer 12, such that the first plain foil area 14 is well protected against incidents such as breakage and short circuits.

In an optional embodiment, the second plain foil area 23 extends out of the first plain foil area 14; and the second tab 60 is arranged in an area of the second plain foil area 23, wherein the area extends out of the first plain foil area 14. Even if the burrs on the second tab 60 penetrate through the separator 30, the second tab 60 contacts the second electrode plate 20 instead of contacting the first electrode plate 10 so as to avoid the short circuit. The electrode assembly 100 further comprises a second insulating member 80. The second insulating member 80 covers an end portion of the first plain foil area 14, preventing the burrs on the end portion of the first plain foil area 14 from penetrating through the separator 30 and contacting the second electrode plate 20.

Figure 2:
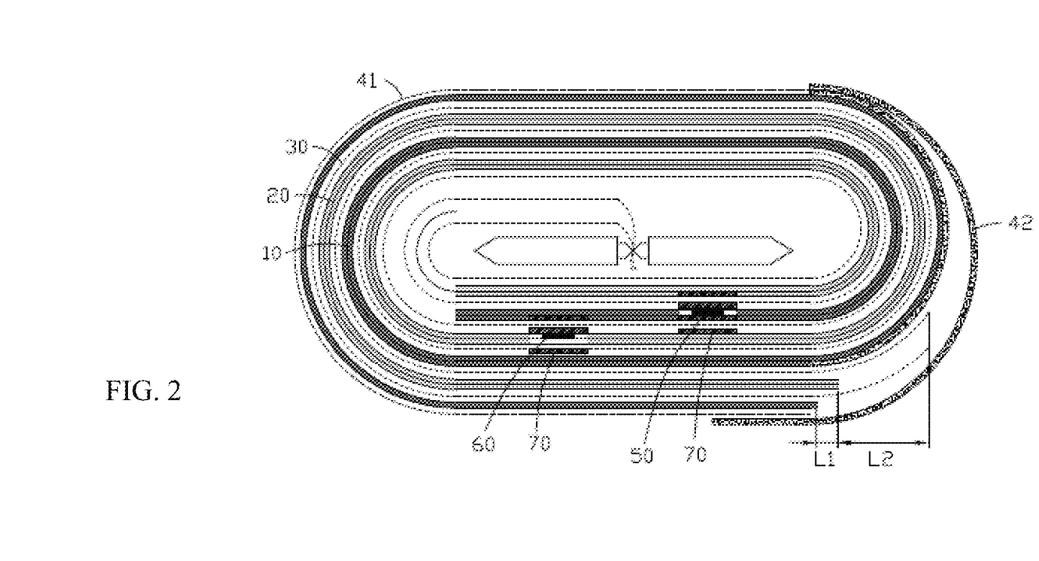
FIG. 2 is a winding structural diagram of an electrode assembly in an embodiment.

Referring to FIG. 2, in one of the embodiments of the application, the first tab 50 is arranged in an area coated with the first active material layer 12 on the first current collector 11, and the second tab 60 is arranged in an area coated with the second active material layer 22 on the second current collector 21. The first insulating member 70 is arranged at both the first tab 50 and the second tab 60 to avoid the problem of short circuits. To connect the first tab 50 to the first current collector 11, it needs to remove part of the first active material layer 12 first, such that part of the first current collector 11 is exposed out of the first active material layer 12, and then the first tab 50 is welded on the exposed part of the first current collector 11. The second tab 60 is connected to the second current collector 21 in the similar way, which is not described repeatedly here. In other embodiments, the first tab 50 and the second tab 60 can further be separately arranged in either the plain foil area at the winding core of the electrode assembly 100 or other position of the electrode plate. The application is not limited to such way.

Figure 4:
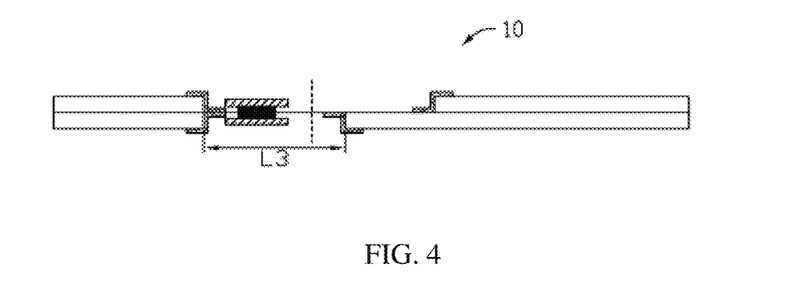
FIG. 4 is an unfolded structural diagram of a first electrode plate in a comparative embodiment.
Figure 5:
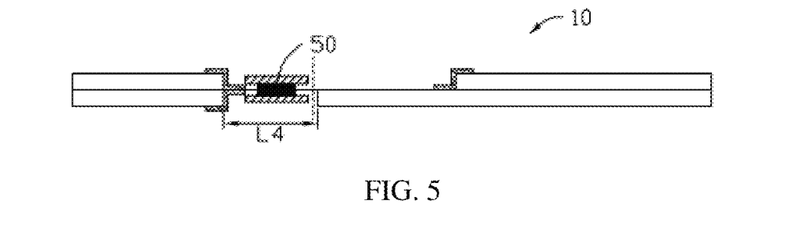
FIG. 5 is an unfolded structural diagram of a first electrode plate in an embodiment.

Referring to FIG. 4 and FIG. 5, the position shown by the dotted line in the figures is the cutout position of two adjacent first electrode plates 10 during manufacturing. When the first tab 50 is arranged in the first plain foil area 14, since the electrode assembly in the comparative embodiment is provided with a section of plain aluminum foil at the outermost ring, and in the comparative embodiment as shown by FIG. 4 the length L3 of the plain aluminum foil area is apparently greater than the length L4 of the plain aluminum foil area in the embodiment of the application as shown in FIG. 5, the length L4 of the plain aluminum foil area in the embodiment of the application only needs to meet the parameter requirement of the winding starting end of the electrode assembly 100, which not only saves the aluminum foil consumables, but also removes the plain aluminum foil at the outermost ring. Under extreme breakage conditions, the possibility of generating aluminum chips is greatly reduced, thereby greatly eliminating dangerous short circuits caused by chips, avoiding the risk of fire explosion of the electrode assembly 100, and enhancing the safety of the electrode assembly 100 used under extreme conditions.

Figure 6:
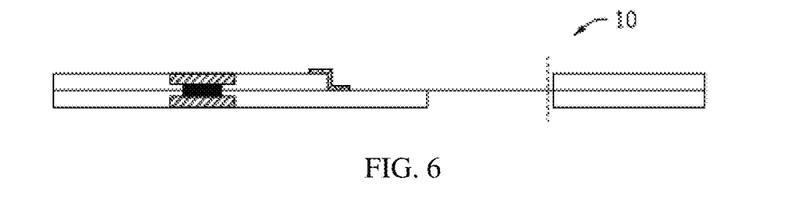
FIG. 6 is an unfolded structural diagram of a first electrode plate in a comparative embodiment.
Figure 7:
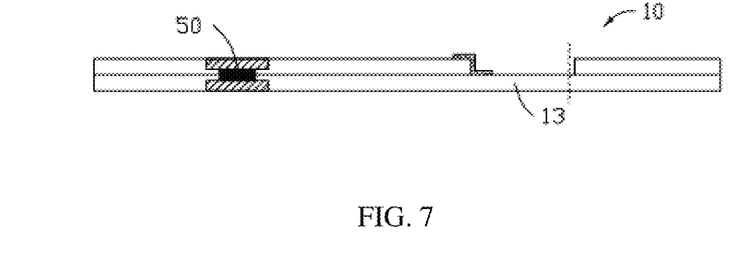
FIG. 7 is an unfolded structural diagram of a first electrode plate in an embodiment.

Referring to FIG. 6 and FIG. 7, when the first tab 50 is arranged in the area coated with the first active material layer 12 on the first current collector 11, the electrode assembly in the comparative embodiment is provided with a section of plain aluminum foil at the outermost ring, in the comparative embodiment as shown in FIG. 6 a section of single-coated area and a section of plain aluminum foil exist between two adjacent first electrode plates 10 and the single-coated area is the winding terminating end 13 of the first electrode plate 10, while in the embodiment of the application as shown in FIG. 7 the plain aluminum foil between two adjacent first electrode plates 10 is removed and there is only a section of single-coated area (the winding terminating end 13 of the first electrode plate 10), such that the first active material layer 12 on a lower surface of the first current collector 11 can be continuous, thereby simplifying the manufacturing process of the first electrode plate 10 and improving the production efficiency.

Figure 8:
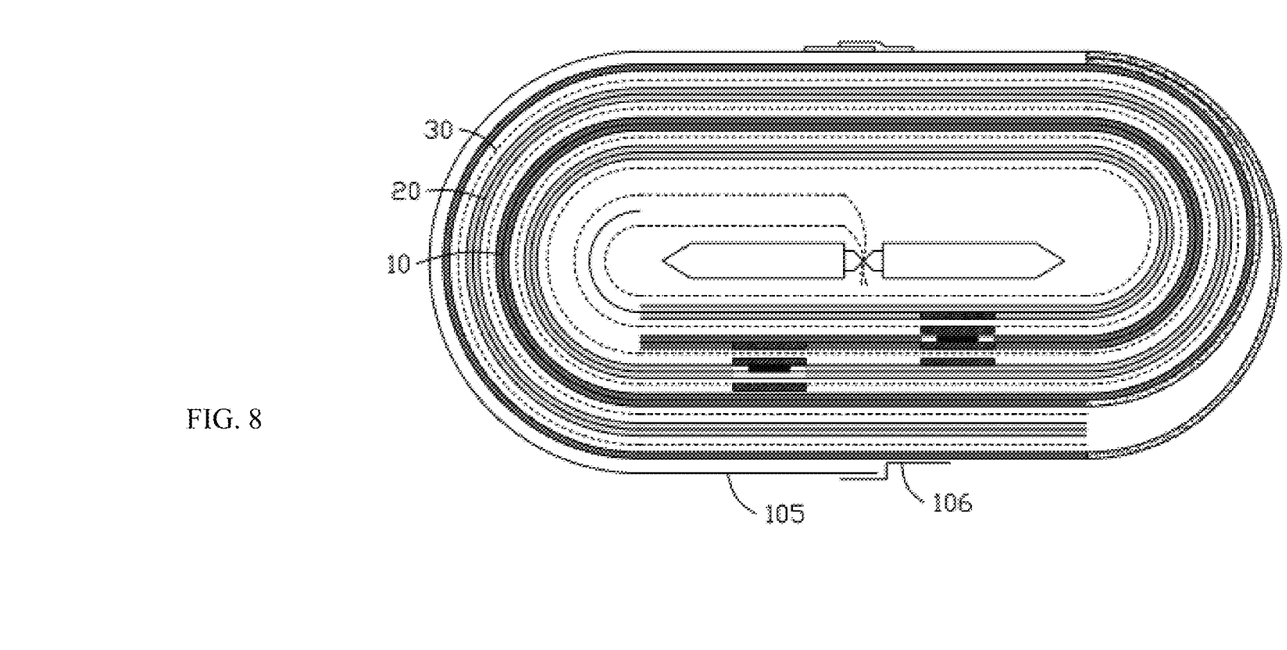
FIG. 8 is a winding structural diagram of an electrode assembly in a comparative embodiment.

Referring to FIG. 8, in a comparative embodiment, part of plain aluminum foil 105 (without the active material coating on both sides) exists in the outside tail of the electrode assembly, and the tail plain aluminum foil and a coating edge at the tail are attached with one layer of insulating tape 106. The plain aluminum foil 105 and the insulating tape 106 are both positioned in the first plane 101 or the second plane 102 of the electrode assembly.

The specific content of the impact test of the electrode assembly 100 in the comparative embodiment and in the embodiment of the application is as follows: The fully charged electrode assembly was placed on a plat iron sheet. A round rod with a diameter φ of 15.8±0.1 mm and a length of at least 6 cm was perpendicular to a test sample (at the position of the tab). A heavy hammer with a mass of 9.1±0.1 Kg perpendicularly fell down in a free state from a position 61±2.5 cm away from the cross point of the round rod and the test piece. The pass rates of the electrode assemblies were compared. The pass criterion is that the electrode assembly does not fire and explode after the test is finished.

The impact test data of the electrode assemblies 100 in the comparative embodiment and in the embodiment of the application can be seen in the table below.

| Type | Impact pass number | Pass ratio |
| --- | --- | --- |
| Embodiment | 9/10 pass | 90% |
| comparative embodiment | 0/10 pass | 0% |

The specific content of the drop test of the electrode assembly 100 in the comparative embodiment and in the embodiment of the application is as follows: The electrode assembly was half charged, placed in a special fixture and properly fixed. Then, the fixture was placed at a 1 m high position for drop test. There were a total of four rounds of drops, each round including a drop of each of six faces and four corners. The pass rate of the battery core was compared. The judgment criteria includes breakage of a top seal, liquid leak, 24-hour pressure drop of greater than 30 mV, and a breaking of the aluminum foils.

The thickness of the electrode assembly in the first test group was 3 mm (11-layer winding). The test results can be seen in the table below.

| Group | Drop test | | | | Pass ratio | ED Loss ratio |
|---|---|---|---|---|---|---|
| | Top seal breakage | Liquid leak | 24 h pressure-drop > 30 mV | Aluminum foil breaking | | |
| Embodiment | 0/10 | 5/10 | 0/10 | 8/10 | 67.5% | 0% |
| comparative embodiment | 0/10 | 10/10 | 5/10 | 10/10 | 37.5% | −2.33% |

The thickness of the electrode assembly in the second test group is 5 mm (19-layer winding). The test results can be seen in the table below.

| Group | Drop test | | | | Pass ratio | ED Loss ratio |
|---|---|---|---|---|---|---|
| | Top seal breakage | Liquid leak | 24 h pressure-drop > 30 mV | Aluminum foil breaking | | |
| Embodiment | 0/10 | 6/10 | 0/10 | 8/10 | 65.0% | 0% |
| comparative embodiment | 0/10 | 10/10 | 6/10 | 10/10 | 35.0% | −1.40% |

In conjunction with FIGS. 4-8 and data in table above, in the embodiments of the applications, comparing with the comparative embodiments, the design of no plain aluminum foil at the outermost circle of the electrode assembly 100, lowers the possibility of generating aluminum chips, thereby eliminating dangerous short circuits caused by chips, avoiding the risk of fire explosion of the electrode assembly 100, and enhancing safety of the electrode assembly 100 used under extreme conditions. Moreover, the first adhesive member 41 arranged on the outer surface of the electrode assembly 100 can tightly bond the electrode assembly 100 and the outside package together to prevent the two from generating relative displacement, thereby reducing shear damage.

Figure 9:
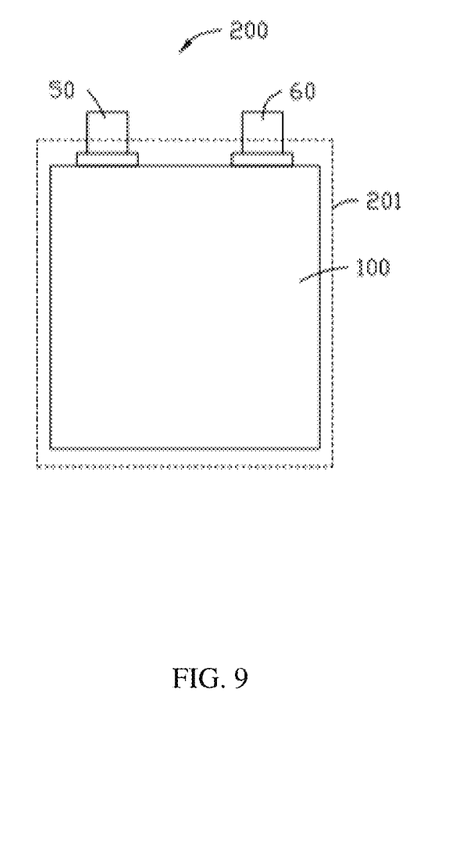
FIG. 9 is a structural diagram of a battery in an embodiment.

Referring to FIG. 9, an embodiment of the present application further discloses a battery 200 which comprises a package 201 and the electrode assembly 100 in the foregoing embodiments, wherein the electrode assembly 100 is accommodated in the package 201, and the tabs of the electrode assembly 100 extend out of the package 201.

The foregoing embodiments are merely used to describe the technical solution of the application, and not to limit the application. Despite of detailed description of the application by reference to the foregoing preferable embodiments, an ordinarily skilled in the art should understand that, various modifications and equivalent substitutions may be made to the technical solutions of the application, and all such modifications and equivalent substitutions fall within the technical conception and scope of the technical solution of the application.

The invention claimed is:

1. An electrode assembly, comprising:
a first electrode plate;
a second electrodeplate, with a polarity opposite to the polarity of the first electrode plate;
a separator, being arranged between the first electrode plate and the second electrode plate, the electrode assembly being formed by winding the first electrode plate, the separator and the second electrode plate;
wherein the first electrode plate comprises a first current collector and a first active material layer; the first active material layer is arranged on a surface of the first current collector; and a winding terminating end of the first electrode plate is positioned on an outer side of a winding terminating end of the second electrode plate facing away from a winding core; the first active material layer on the winding terminating end of the first electrode plate covers one surface of the first current collector facing toward the second electrode plate, the other surface on the winding terminating end of the first electrode plate facing away from the second electrode plate is not coated with the first active material layer;
an outer surface of the electrode assembly includes a first plane, a second plane, a first arc surface and a second arc surface; the first plane, the second arc surface, the second plane, and the first arc surface are arranged along a winding direction of the electrode assembly; along a thickness direction of the electrode assembly, the first plane and the second plane are arranged opposite to each other; along a width direction of the electrode assembly, the first arc surface and the second arc surface are arranged opposite to each other; a thickness of the electrode assembly, defined between the first plane and the second plane, is less than a distance along the width direction of the electrode assembly between the first arc surface and the second arc surface;
the electrode assembly further comprising a first adhesive member, the first adhesive member is arranged on the outer surface of the electrode assembly, wherein the electrode assembly further comprises a second adhesive member; the first adhesive member consists of portions that cover the first plane, the second arc surface, and the second plane of the electrode assembly; the first adhesive member is connected to and overlaps with the second adhesive member, and the second adhesive member is connected to the winding terminating end of the first electrode plate and covers the first arc surface of the electrode assembly, wherein the second adhesive member further extends to overlap with both the winding terminating end of the first electrode plate and the winding terminating end of the second electrode plate.

2. The electrode assembly according to claim 1, wherein the first adhesive member is a semi-liquid viscous material, arranged on the outer surface of the electrode assembly in a form of spot coating or coating.

3. The electrode assembly according to claim 1, wherein the first adhesive member has a thickness of less than or equal to 20 µm.

4. The electrode assembly according to claim 1, wherein the second adhesive member has a thickness of 15 µm-25 µm.

5. The electrode assembly according to claim 1, wherein the winding terminating end of the second electrode plate extends out of the winding terminating end of the first electrode plate along a winding direction of the electrode assembly.

6. The electrode assembly according to claim 5, wherein a winding terminating end of the separator extends out of the winding terminating end of the second electrode plate along the winding direction of the electrode assembly.

7. The electrode assembly according to claim 1, wherein the electrode assembly further comprises a first tab and a second tab, the first tab is connected to the first electrode plate; the second tab is connected to the second electrode plate; and along the thickness direction of the electrode assembly, projections of the first tab and the second tab are not overlapped.

8. The electrode assembly according to claim 7, wherein a winding starting end of the first electrode plate is provided with a first plain foil area; a winding starting end of the second electrode plate is provided with a second plain foil area; the first tab is arranged in the first plain foil area; and the second tab is arranged in the second plain foil area.

9. The electrode assembly according to claim 8, wherein the electrode assembly further comprises a first insulating member, the first insulating member is arranged in the first plain foil area and covers the first tab.

10. The electrode assembly according to claim 1, wherein the first adhesive member has a bonding force of 100-1000 N/m, and a tensile breaking stress of smaller than or equal to 4000 N/m.

11. A battery comprising an electrode assembly according to claim 1 and a package, wherein the electrode assembly is accommodated in the package; and tabs of the electrode assembly extend out of the package;
wherein the first adhesive member is bonded with the outer surface of the electrode assembly and the package together.

12. The battery according to claim 11, wherein the first adhesive member is a semi-liquid viscous material, arranged on the outer surface of the electrode assembly in a form of spot coating or coating.

13. The battery according to claim 11, wherein the first adhesive member has a thickness of smaller than or equal to 20 µm.

14. The battery according to claim 11, wherein the second adhesive member has a thickness of 15 µm-25 µm.

15. The battery according to claim 11, wherein the winding terminating end of the second electrode plate extends out of the winding terminating end of the first electrode plate along a winding direction of the electrode assembly.

16. The battery according to claim 15, wherein a winding terminating end of the separator extends out of the winding terminating end of the second electrode plate along the winding direction of the electrode assembly.

17. The battery according to claim 11, wherein the electrode assembly further comprises a first tab and a second tab, the first tab is connected to the electrode plate; the second tab is connected to the second electrode plate; and along the thickness direction of the electrode assembly, the projections of the first tab and the second tab are not overlapped.

18. The battery according to claim 17, wherein a winding starting end of the first electrode plate is provided with a first plain foil area; a winding starting end of the second electrode plate is provided with a second plain foil area; the first tab is arranged in the first plain foil area; and the second tab is arranged in the second plain foil area.

19. The electrode assembly according to claim 1 wherein an area on the outer surface of the electrode assembly which is not attached with the second adhesive member is covered by the first adhesive member.

* * * * *